Patented Jan. 19, 1926.

1,570,006

UNITED STATES PATENT OFFICE.

HERMAN REINBOLD AND HUGO REINBOLD, OF OMAHA, NEBRASKA; SAID HUGO REINBOLD ASSIGNOR TO SAID HERMAN REINBOLD.

PROCESS FOR TREATING ALUMINO-SILICATES.

No Drawing. Application filed January 21, 1924. Serial No. 687,655.

*To all whom it may concern:*

Be it known that we, HERMAN REINBOLD and HUGO REINBOLD, both citizens of the United States of America, residing at Omaha, in the county of Douglas and State of Nebraska, have invented certain new and useful Improvements in Processes for Treating Alumino-Silicates, of which the following is a specification.

This invention relates to processes for preparing minerals such as true or altered bentonites or other alumino-silicates, for use as a water softening agent.

In their natural state the clays or minerals (hydrous aluminum silicates) are deficient in either or both alumina or alkali, owing to infiltration or alteration by lime, magnesia, iron, etc., and since these impurities have no beneficial effect when the mineral is used for water softening purposes they impair the efficiency of the mineral by the amount or active ingredients (alumina and sodium) which they have replaced.

The principal object of this invention is to provide a process or means whereby the altered mineral, as found in nature (originally a true aluminum sodium silicate having a definite structural formula), can be reconverted or reconstructed to its original pure state by removing the undesirable constituents, lime and magnesia, etc., as chlorides and sulphates and substituting for them, aluminum and sodium hydroxides—the aluminum and sodium hydroxides being placed in actual chemical combination in the mineral forming a pure stable sodium aluminum silicate.

It is not new to remove infiltrated impurities, such as calcium, magnesium, iron, etc., by contact with a sodium chloride solution but to carry this process further and replace the removed impurities by aluminum and sodium hydroxides so as to restore the structure of the original aluminum sodium silicate is new and the primary object of this invention.

This invention is particularly adaptable to bentonite, a colloid clay described in our co-pending application, Serial No. 669,306, filed Oct. 18, 1923. The so-called bentonite of commerce is not a pure sodium aluminum silicate but carries the above mentioned impurities which have replaced a portion of the alumina or alkali of the true bentonite. The true bentonite can, however, be completely reconstructed by the present process.

The principal step in our process is the addition of alumina base to the clay. The alumina base may be added to the clay either by addition to the wet mineral in dry form of aluminum sulphate and caustic soda, or in solution as will be later described.

One form of our process of preparing bentonite-like minerals for use as a water softening agent will now be described in detail, (a) Grinding and sizing. The natural mineral is ground and screened to size desired for use in the tanks of the water softening mechanism.

(b) Calcining. The sized mineral is now calcined to a temperature between 800 and 950 degrees C., until a test by pyrometer or Seger cones shows that it has commenced to sinter.

(c) Activating. The calcined mineral is soaked or steeped in a solution of sodium aluminate containing five per cent of a solution of common salt (NaCl). This solution should contain the least possible amount of water to reduce the time required for drying out the excess. The preferred method of preparing this solution will be later described.

(d) Drying. The activated mineral is now subjected to a heat of approximately 105° C. to evaporate out the excess water and it is ready for use.

The resulting product is a stable sodium aluminum silicate, the impurities (lime, magnesium, etc.) in the chemical combination having been replaced by aluminum and sodium hydroxides. These impurities are now present as soluble chlorides and sulphates which are washed from the product, either in the factory or more preferably, after it is in place in the water softener tanks.

The solution used in step (c) is best made by adding to a concentrated solution of technical aluminum sulphate, such as used on a large scale by water works as a coagulating and settling agent, a concentrated solution of caustic soda, which at first precipitates the alumina as hydroxide, but on further addition re-dissolves the alumina forming soluble sodium aluminate. To this solution is added five percent of a solution of common salt (NaCl). The calcined mineral is soaked in this solution in the proportion of from 15 to 18 parts (dry) chemicals to each 100 parts of mineral, depending, of course, on the deficiency of active ingredients in the natural mineral. The amount of water is kept at a minimum, just enough being used to insure the solution being entirely absorbed by the mineral, leaving but small excess to be evaporated out.

When the dry aluminum sulphate and caustic are added to the wet mineral, the above reactions all take place within the mineral itself. The use of the NaCl solution may be dispensed with, without impairing the effectiveness of the process, it being used only to reduce the amount of caustic necessary and thereby reduce the cost of the process.

The use of the words "clay" and "mineral" herein is to designate any bentonite-like, so-called alumino-silicate which can be reconverted, either entirely or partially, into a stable sodium aluminum silicate.

If desired, the salt and caustic soda may be added to the mineral before the calcination step and the aluminum sulphate added after the calcination.

While we have described in some detail one perferred method of carrying out our process, together with the theories which we believe to explain the success of the same, it is understood that our invention is not limited to the precise procedure described nor is it dependent upon the accuracy of the theories which we have advanced. On the contrary, our invention is not to be regarded as limited except in so far as such limitations are included within the terms of the accompanying claims, in which, it is our intention to claim all novelty inherent in our invention as broadly as is permissible in view of the prior art.

Having thus described our invention, what we claim and desire to secure by Letters Patent is:—

1. A process of treating altered alumino-silicate minerals of the bentonite variety which are deficient in alumina for use as a water softening agent, comprising the adding thereto of a compound which will introduce aluminum hydroxide therein so as to replace the deficiency.

2. A process of treating the altered alumino-silicate clays of the bentonite variety which are deficient in alumina, comprising the adding thereto of a compound which will introduce alumina base to the clay.

3. A process of treating alumino-silicate minerals, of the bentonite variety, for use as a water softening agent, comprising, grinding and sizing the mineral, calcining the sized mineral; treating the calcined mineral with a soluble aluminum compound and drying out the excess moisture.

4. A process of treating the alumino-silicate minerals, of the bentonite variety, for use as a water softening agent, comprising, grinding and sizing the mineral, calcining the sized mineral; treating the calcined mineral with sodium aluminate and drying out the excess moisture.

5. A process of treating the altered alumino-silicate minerals of the bentonite variety in which a part of the alumina content has been replaced by impurities for use as a water softening agent, comprising, grinding and sizing the mineral, calcining the sized mineral at sintering temperature and treating the calcined product to form aluminum hydroxide so as to replace the deficient alumina.

6. A process of treating the alumino-silicate minerals, of the bentonite variety, for use as a water softening agent, comprising, grinding and sizing the mineral, calcining the sized mineral, treating the calcined mineral with aluminum sulphate and caustic soda and drying the treated mineral.

7. A process of treating the alumino-silicate minerals for use as a water softening agent, comprising, calcining the mineral, treating the calcined mineral with aluminum sulphate, caustic soda, and sodium chloride, and drying the treated mineral.

8. In a process for treating the alumino-silicate minerals for use in softening water, the step which comprises treating the mineral with sodium aluminate.

9. In a process for treating the altered alumino-silicate minerals which are deficient in alumina for use as a water softener, the step which comprises the addition of a compound which will add aluminum oxide to the mineral.

10. In a process for treating the altered alumino-silicate minerals which are deficient in alumina for use in softening water, the step which comprises treating the mineral to form aluminum hydroxide.

11. In a process for treating the altered alumino-silicate minerals of the bentonite variety which are deficient in alumina and alkali for use in softening water, the step which consists in adding to the mineral aluminum sulphate and caustic soda.

12. In a process for treating altered bentonite which is deficient in alumina and alkali for use as a water softening agent, the step which consists in adding to the mineral the combination of water, aluminum sulphate, caustic soda, and sodium chloride.

In testimony whereof, we affix our signatures.

HERMAN REINBOLD.
HUGO REINBOLD.